United States Patent
Inoue

(10) Patent No.: US 10,288,858 B2
(45) Date of Patent: May 14, 2019

(54) ZOOM LENS HAVING A FIRST OPTICAL SYSTEM FORMED ON A MAGNIFICATION SIDE, AND A SECOND OPTICAL SYSTEM FORMED ON THE REDUCTION SIDE, WITH AN INTERMEDIATE IMAGE FORMED THEREBETWEEN, PROJECTION DISPLAY DEVICE, AND IMAGING APPARATUS USING THE SAME

(71) Applicant: FUJIFILM Corporation, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 48 days.

(21) Appl. No.: 15/686,338

(22) Filed: Aug. 25, 2017

(65) Prior Publication Data

US 2018/0059391 A1    Mar. 1, 2018

(30) Foreign Application Priority Data

Aug. 30, 2016   (JP) ................................. 2016-168095

(51) Int. Cl.
| G02B 23/14 | (2006.01) |
| G02B 15/167 | (2006.01) |
| G02B 13/16 | (2006.01) |
| G02B 15/177 | (2006.01) |
| G02B 15/20 | (2006.01) |
| G02B 15/173 | (2006.01) |

(52) U.S. Cl.
CPC ........... *G02B 15/167* (2013.01); *G02B 13/16* (2013.01); *G02B 15/173* (2013.01); *G02B 15/177* (2013.01); *G02B 15/20* (2013.01)

(58) Field of Classification Search
CPC ... G02B 9/00; G02B 9/60; G02B 9/62; G02B 9/64; G02B 15/00; G02B 15/14; G02B 15/16; G02B 15/163; G02B 15/167; G02B 15/177
USPC ....... 359/362, 363, 432, 434, 642, 676, 683, 359/684, 694, 695, 754, 756, 761, 763, 359/770
See application file for complete search history.

(56) References Cited

U.S. PATENT DOCUMENTS

| 9,041,848 B2* | 5/2015 | Inoko ...................... G02B 3/00 348/335 |
| 2015/0077848 A1* | 3/2015 | Ichimura ................ G02B 13/16 359/434 |
| 2018/0157011 A1* | 6/2018 | Oe ...................... G02B 13/0095 |

FOREIGN PATENT DOCUMENTS

JP         2015-152764 A     8/2015

* cited by examiner

*Primary Examiner* — Arnel C Lavarias
(74) *Attorney, Agent, or Firm* — Studebaker & Brackett PC

(57) ABSTRACT

In the zoom lens, a first optical system is formed on the magnification side, and a second optical system is formed on the reduction side, with the intermediate image formed between the first optical system and the second optical system. The first optical system has a 5-group configuration, where the second to fourth lens groups move during zooming. In the first optical system, three or more negative lenses are disposed continuously in order from a position closest to the magnification side. The first optical system has a first cemented lens that is formed by cementing a negative lens and two positive lenses, of which Abbe numbers are larger than that of the negative lens, in order of positive, negative, and positive powers.

17 Claims, 10 Drawing Sheets

EXAMPLE 1

EXAMPLE 2

EXAMPLE 3

EXAMPLE 2

EXAMPLE 3

ZOOM LENS HAVING A FIRST OPTICAL SYSTEM FORMED ON A MAGNIFICATION SIDE, AND A SECOND OPTICAL SYSTEM FORMED ON THE REDUCTION SIDE, WITH AN INTERMEDIATE IMAGE FORMED THEREBETWEEN, PROJECTION DISPLAY DEVICE, AND IMAGING APPARATUS USING THE SAME

CROSS-REFERENCE TO RELATED APPLICATIONS

The present application claims priority under 35 U.S.C. § 119 to Japanese Patent Application No. 2016-168095, filed on Aug. 30, 2016. The above application is hereby expressly incorporated by reference, in its entirety, into the present application.

BACKGROUND OF THE INVENTION

1. Field of the Invention

The present invention relates to a zoom lens forming an intermediate image, a projection display device comprising the zoom lens, and an imaging apparatus comprising the zoom lens.

2. Description of the Related Art

In the past, projection display devices, each of which projects an image displayed on a light valve such as a liquid crystal display element or a Digital Micromirror Device (DMD: registered trademark) onto a screen or the like in an enlarged manner, have come into widespread use. In recent years, with the improvement in the performance of light valves, it has become necessary to perform favorable aberration correction appropriate for the resolutions of light valves on projection lenses used in combination with light valves. Further, from the viewpoint of installability, there is a tendency that a projection lens having a zooming function is preferred.

As an optical system that is applicable to a projection display device and has a zooming function, for example, an optical system described in the following JP2015-152764A has been proposed. JP2015-152764A describes an optical system in which an intermediate image is formed inside a lens system and the intermediate image is re-imaged again.

SUMMARY OF THE INVENTION

In recent years, scenes projected onto a large screen in a large hall, exhibition, or the like through a projection display device have been increasing. For these reasons, there has been a strong demand for a zoom lens having a wider angle. In addition, there has also been a demand for a zoom lens having a small F number.

However, in order to sufficiently cope with the recent demands, improvement in the angle of view and the F number is necessary for the optical system described in JP2015-152764A.

The present invention has been made in consideration of the above-mentioned situations, and its object is to provide a high optical performance zoom lens that has a small F number with a wide angle, a projection display device comprising the zoom lens, and an imaging apparatus comprising the zoom lens.

A zoom lens of the present invention forms an intermediate image at a position conjugate to a reduction side imaging plane and causes the intermediate image to be re-imaged on a magnification side imaging plane. The zoom lens consisting of, in order from the magnification side: a first optical system; and a second optical system. The intermediate image is positioned between the first optical system and the second optical system. The first optical system consists of, in order from the magnification side, a first lens group that has a negative refractive power as a whole, a second lens group, a third lens group, a fourth lens group, and a fifth lens group, and the second lens group, the third lens group, and the fourth lens group move by changing spacings between the groups adjacent to each other in an optical axis direction during zooming. The first optical system has three or more negative lenses continuously in order from a position closest to the magnification side. The first optical system has a first cemented lens which is formed by cementing a positive lens, a negative lens, and a positive lens in order from the magnification side, and an Abbe number of each of the two positive lenses within the first cemented lens at the d line is larger than that of the negative lens within the first cemented lens. In addition, a second cemented lens, which is formed by cementing a negative lens and a positive lens and has a positive refractive power as a whole, is disposed to be closest to the magnification side of the second optical system.

It is preferable that the zoom lens of the present invention satisfies at least one of the following conditional expressions (1) to (9), (12), or (13).

$$8 < \nu 2n - \nu 2p < 30 \tag{1}$$

$$30 < \nu 11 - \nu 12 < 42 \tag{2}$$

$$50 < \nu 13 - \nu 12 < 60 \tag{3}$$

$$-0.1 < |fw|/fc1 < 0 \tag{4}$$

$$0 < |fw|/fc11 < 0.4 \tag{5}$$

$$-0.5 < |fw|/fc12 < -0.1 \tag{6}$$

$$0 < |fw|/fc13 < 0.2 \tag{7}$$

$$0.1 < |fw|/Rc1 < 0.168 \tag{8}$$

$$0 < |fw|/Rc2 < 0.2 \tag{9}$$

$$0.2 < |fw|/f1 < 1 \tag{12}$$

$$0 < |fw|/f2 < 0.15 \tag{13}$$

Here, ν2n is an Abbe number of the negative lens within the second cemented lens at the d line, ν2p is an Abbe number of the positive lens within the second cemented lens at the d line, ν11 is an Abbe number of the positive lens close to the magnification side within the first cemented lens at the d line, ν12 is an Abbe number of the negative lens within the first cemented lens at the d line, ν13 is an Abbe number of the positive lens close to the reduction side within the first cemented lens at the d line, fw is a focal length of the whole system at a wide-angle end, fc1 is a focal length of the first cemented lens, fc11 is a focal length of the positive lens close to the magnification side within the first cemented lens, fc12 is a focal length of the negative lens within the first cemented lens, fc13 is a focal length of the positive lens close to the reduction side within the first cemented lens, Rc1 is a radius of curvature of a cemented surface close to the reduction side within the first cemented lens, Rc2 is a radius of curvature of a surface of the second cemented lens closest to the reduction side, f1 is a focal length of the first optical system at the wide-angle end, and f2 is a focal length of the second optical system at the wide-angle end.

In the zoom lens of the present invention, it is preferable that the first cemented lens is disposed in the third lens group.

It is preferable that the zoom lens of the present invention further comprises a lens at a position closer to the reduction side than the second cemented lens and satisfies the following conditional expression (10).

$$0.2 < d12/d2r < 0.7 \tag{10}$$

Here, d12 is a spacing on the optical axis between a lens surface of the first optical system closest to the reduction side and a lens surface of the second optical system closest to the magnification side, and d2r is a spacing on the optical axis between a lens, which is continuously disposed with the second cemented lens on the reduction side of the second cemented lens, and the second cemented lens.

It is preferable that the zoom lens of the present invention further comprises a lens at a position closer to the reduction side than the second cemented lens and satisfies the following conditional expression (11).

$$1.5 < d2r/Y\text{max} < 5 \tag{11}$$

Here, d2r is a spacing on the optical axis between a lens, which is continuously disposed with the second cemented lens on the reduction side of the second cemented lens, and the second cemented lens, and Ymax is a maximum image height on the reduction side.

A projection display device of the present invention comprises: a light source; a light valve into which light originated from the light source is incident; and the zoom lens of the present invention, the zoom lens projecting an optical image, which is formed by light modulated through the light valve, onto a screen.

An imaging apparatus of the present invention comprises the above-mentioned zoom lens of the present invention.

It should be noted that the "magnification side" means a projected side (screen side). Even in a case where projection is performed in a reduced manner, for convenience, the screen side is referred to as the magnification side. On the other hand, the "reduction side" means an original image display region side (light valve side). Even in a case where projection is performed in a reduced manner, for convenience, the light valve side is referred to as the reduction side.

It should be noted that the "consists of . . . " means that the zoom lens may include, substantially, not only the above-mentioned elements but also lenses substantially having no powers, optical elements, which are not lenses, such as a reflection member substantially having no power, a stop, a filter, and/or a cover glass, and the like.

It should be noted that the "lens group" is not necessarily formed of a plurality of lenses, but may be formed of only one lens. Further, signs of refractive powers of the lens groups, signs of refractive powers of the lenses, and radii of curvature of the surfaces are assumed as those in paraxial regions in a case where some lenses have aspheric surfaces unless otherwise noted. Signs of radii of curvature of surfaces convex toward the magnification side are set to be positive, and signs of radii of curvature of surfaces convex toward the reduction side are set to be negative. Values of all the conditional expressions are based on the d line (a wavelength of 587.6 nm).

According to the present invention, in the zoom lens which forms the intermediate image, the first optical system closer to the magnification side than the intermediate image is formed of a zoom optical system having a 5-group configuration, a configuration of the lens disposed to be closest to the magnification side is appropriately set, and configurations and arrangement of two cemented lens groups each including three cemented lenses are appropriately set. Thus, it is possible to provide a high optical performance zoom lens that has a small F number with a wide angle, a projection display device comprising the zoom lens, and an imaging apparatus comprising the zoom lens.

DESCRIPTION OF THE PREFERRED EMBODIMENTS

Figure 1:
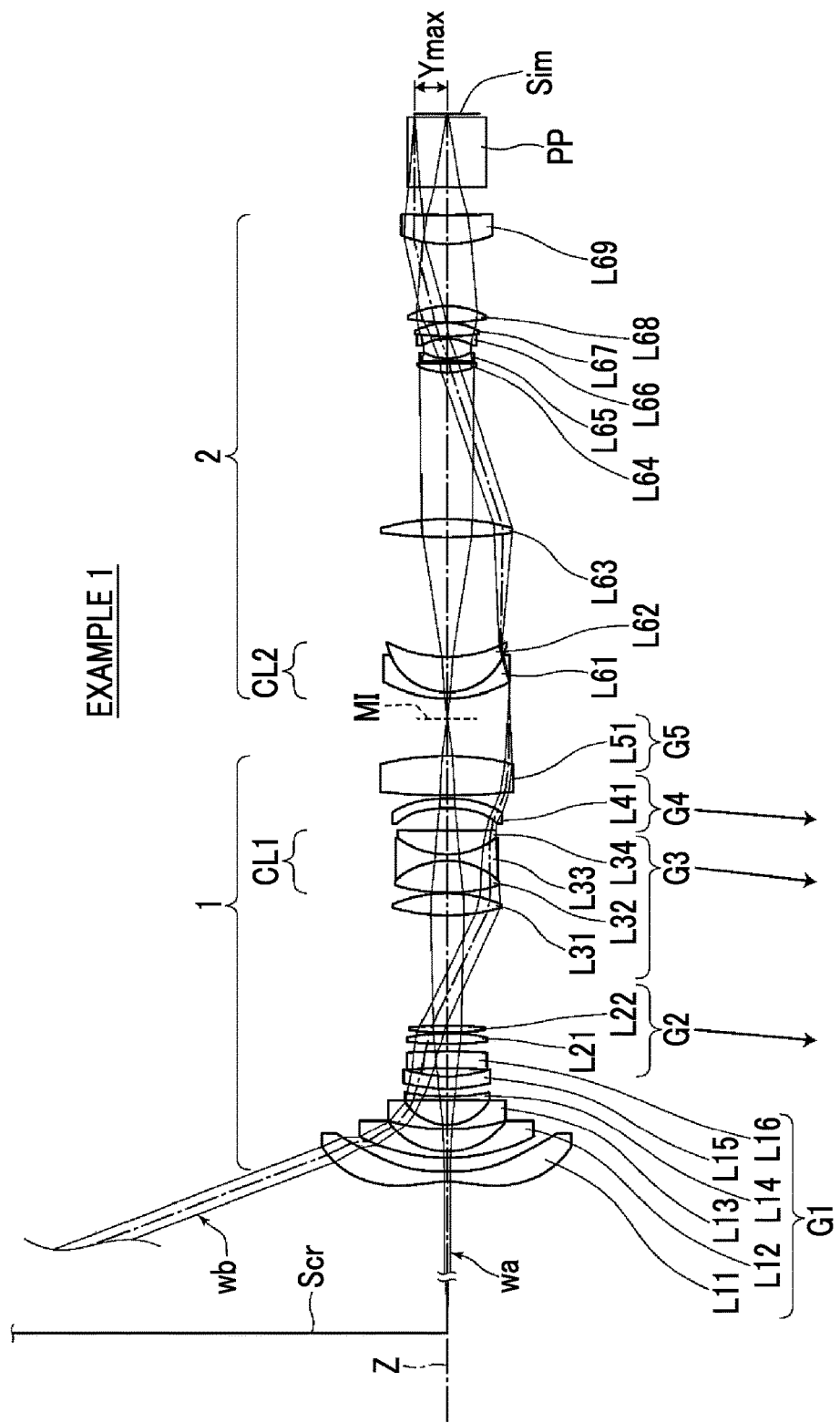
FIG. 1 is a cross-sectional view illustrating a configuration and an optical path of a zoom lens of Example 1 of the present invention.

Hereinafter, embodiments of the present invention will be described with reference to drawings. FIG. 1 is a cross-sectional view illustrating a configuration of a zoom lens at the wide-angle end according to an embodiment of the present invention. The exemplary configuration shown in FIG. 1 corresponds to Example 1 to be described later. In FIG. 1, the left side is the magnification side, and the right side is the reduction side, and on-axis rays wa and rays with the maximum angle of view wb are also shown.

The zoom lens is an optical system that forms an intermediate image at a position conjugate to a reduction side imaging plane and causes the intermediate image to be re-imaged on a magnification side imaging plane. This zoom lens is, for example, mounted on a projection display device, and can be used to project image information displayed on the light valve onto the screen. In FIG. 1, assuming that the zoom lens is mounted on the projection display device, a screen Scr, an optical member PP such as a filter and a prism used in a color synthesizing section or an illumination light separating section, and an image display surface Sim of a light valve positioned on the reduction side of the optical member PP are also shown. In the projection display device, rays, which are made to have image information through the image display surface Sim, are incident into the zoom lens through the optical member PP, and are transmitted onto a screen, which is not shown in the drawing, through the zoom lens. That is, in the example of FIG. 1, the image display surface Sim corresponds to the reduction side imaging plane, and the screen Scr corresponds to the magnification side imaging plane.

It should be noted that, in FIG. 1, for simplification of the drawing, only one image display surface Sim is shown, but the projection display device may be configured such that the rays originating from a light source is separated into rays with three primary colors through a color separation optical system, three light valves for the respective primary colors are arranged, and a full-color image is displayed.

In the zoom lens, a first optical system 1 is formed on the magnification side, and a second optical system 2 is formed on the reduction side, with an intermediate image MI formed therebetween. The second optical system 2 forms the intermediate image MI at a position conjugate to the reduction side imaging plane, and the first optical system 1 causes the intermediate image MI to be re-imaged on the magnification side imaging plane. In addition, in FIG. 1, only a part of the intermediate image MI including the vicinity of the optical axis is indicated by the dotted line.

In a normal optical system that does not form an intermediate image, if a wide angle is intended to be achieved by shortening a focal length thereof, the diameter of the magnification side lens inevitably becomes excessively large. However, in a manner similar to that of the present embodiment, in an optical system that forms an intermediate image MI and further causes the intermediate image MI to be re-imaged on the screen Scr, it is possible to decrease the diameter of the magnification side lens, and the optical system is appropriate to achieve the wide angle by shortening the focal length.

In the zoom lens, the first optical system 1 has a 5-group configuration in which there are provided, in order from the magnification side along the optical axis Z, a first lens group G1, a second lens group G2, a third lens group G3, a fourth lens group G4, and a fifth lens group G5. During zooming, the second lens group G2, the third lens group G3, and the fourth lens group G4 move by changing spacings between the groups adjacent to each other in the optical axis direction. Zooming is performed using these three lens groups, whereby it is possible to suppress the fluctuation in aberrations in a case where a magnification thereof is changed. In FIG. 1, under each of these three lens groups, the direction of each lens group moving during zooming from the wide-angle end to the telephoto end is schematically indicated by an arrow. On the other hand, in a manner similar to that of the example shown in FIG. 1, the first lens group G1 and the fifth lens group G5 may be configured to remain stationary with respect to the reduction side imaging plane during zooming.

The first lens group G1 is configured to have a negative refractive power as a whole. By providing a negative refractive power to the first lens group G1 closest to the magnification side, there is an advantage of achieving a wide angle. All of the second lens group G2, the third lens group G3, the fourth lens group G4, and the fifth lens group G5 can be configured to have a positive refractive power as a whole. In such a case, it becomes easy to perform zooming while suppressing spherical aberration.

The second optical system 2 may be configured to remain stationary with respect to the reduction side imaging plane during zooming. In such a case, even in a case where zooming is performed, a relationship between the intermediate image MI and the reduction side imaging plane is not changed. Therefore, in a manner similar to that of a case where the zoom lens is mounted on the projection display device, in a system in which light is incident from the reduction side, fluctuation in aberrations during zooming from the intermediate image MI to the magnification side may be considered, and the system may be configured such that the first optical system 1 suppresses the fluctuation in aberrations during zooming.

In the example shown in FIG. 1, the first lens group G1 includes, in order from the magnification side, six lenses as lenses L11 to L16, the second lens group G2 includes, in order from the magnification side, two lenses as lenses L21 and L22, the third lens group G3 includes, in order from the magnification side, four lenses as lenses L31 to L34, the fourth lens group G4 includes only one lens as a lens L41, and the fifth lens group G5 includes only one lens as a lens L51. The second optical system 2 includes, in order from the magnification side, nine lenses as lenses L61 to L69. However, the lens groups and the second optical system 2 each may have a number of lenses different from that in the example shown in FIG. 1.

The first optical system 1 is configured to have three or more negative lenses continuously in order from a position closest to the magnification side. Thereby, it becomes easy to suppress the field curvature.

Further, the first optical system 1 is configured to have a first cemented lens CL1 which is formed by cementing a positive lens, a negative lens, and a positive lens in order from the magnification side. Then, an Abbe number of each of the two positive lenses within the first cemented lens CL1 at the d line is larger than an Abbe number of the negative lens within the first cemented lens CL1 at the d line. By providing such first cemented lens CL1, it is possible to suppress high-order aberrations. Further, since it is possible to decrease an absolute value of a radius of curvature of a cemented surface of the cemented lens, it is possible to suppress longitudinal chromatic aberration and lateral chromatic aberration. With such a configuration, there is an advantage in realizing a wide-angle lens system that has a small F number.

It is preferable that the first cemented lens CL1 is disposed in the third lens group G3. In the zoom lens, the first lens group G1 has a negative refractive power, and thus in the third lens group G3 and fourth lens group G4, the ray heights become higher, and effects of aberration correction are enhanced. Therefore, it is an effective way that the first cemented lens CL1 is disposed in the third lens group G3 or the fourth lens group G4. Since the cemented lens is disposed in the third lens group G3 on the magnification side thereof, there is an advantage of suppressing spherical aberration caused by the colors.

A second cemented lens CL2, which is formed by cementing a negative lens and a positive lens and has a positive refractive power as a whole, is disposed to be closest to the magnification side of the second optical system 2. The second cemented lens CL2 having the above-mentioned configuration is disposed to be close to the intermediate image MI. With such a configuration, there is an advantage of suppressing longitudinal chromatic aberration and lateral chromatic aberration. It is preferable that the second cemented lens CL2 is formed by cementing a negative lens and a positive lens in order from the magnification side. In such a case, there is a further advantage of suppressing longitudinal chromatic aberration and lateral chromatic aberration.

Next, a preferred configuration relating to the conditional expressions and effects thereof will be described. It is preferable that the zoom lens satisfies any one or an arbitrary combination of conditional expressions to be described below.

Regarding the second cemented lens CL2, it is preferable that the lens satisfies the following conditional expression (1). By satisfying the conditional expression (1), it becomes easy to suppress longitudinal chromatic aberration and lateral chromatic aberration. Since the ray height of the off-axis ray is high at a lens component close to the intermediate image MI, Abbe numbers of the positive and negative lenses within the second cemented lens CL2 close to the intermediate image MI are set to satisfy the conditional expression (1). Thereby, it is possible to effectively correct particularly lateral chromatic aberration, and there is an advantage of achieving a wide angle. In order to enhance the effect relating to the conditional expression (1), it is more preferable that the following conditional expression (1-1) is satisfied.

$$8 < \nu 2n - \nu 2p < 30 \tag{1}$$

$$10 < \nu 2n - \nu 2p < 28 \tag{1-1}$$

Here, ν2n is an Abbe number of the negative lens within the second cemented lens CL2 at the d line, and ν2p is an Abbe number of the positive lens within the second cemented lens CL2 at the d line.

Regarding the first cemented lens CL1, it is preferable that the lens satisfies at least one or an arbitrary combination of the following conditional expressions (2) to (7) and (2-1) to (7-1). In such a case, it becomes easy to suppress longitudinal chromatic aberration and lateral chromatic aberration.

$$30 < \nu 11 - \nu 12 < 42 \tag{2}$$

$$30.5 < \nu 11 - \nu 12 < 41.5 \tag{2-1}$$

$$50 < \nu 13 - \nu 12 < 60 \tag{3}$$

$$52 < \nu 13 - \nu 12 < 58 \tag{3-1}$$

$$-0.1 < |fw|/fc1 < 0 \tag{4}$$

$$-0.09 < |fw|/fc1 < -0.01 \tag{4-1}$$

$$0 < |fw|/fc11 < 0.4 \tag{5}$$

$$0.05 < |fw|/fc11 < 0.35 \tag{5-1}$$

$$-0.5 < |fw|/fc12 < -0.1 \tag{6}$$

$$-0.45 < |fw|/fc12 < -0.15 \tag{6-1}$$

$$0 < |fw|/fc13 < 0.2 \tag{7}$$

$$0.05 < |fw|/fc13 < 0.195 \tag{7-1}$$

Here, ν11 is an Abbe number of the positive lens close to the magnification side within the first cemented lens CL1 at the d line, ν12 is an Abbe number of the negative lens within the first cemented lens CL1 at the d line, ν13 is an Abbe number of the positive lens close to the reduction side within the first cemented lens CL1 at the d line, fw is a focal length of the whole system at a wide-angle end, fc1 is a focal length of the first cemented lens CL1, fc11 is a focal length of the positive lens close to the magnification side within the first cemented lens CL1, fc12 is a focal length of the negative lens within the first cemented lens CL1, and fc13 is a focal length of the positive lens close to the reduction side within the first cemented lens CL1.

It is preferable that the zoom lens satisfies the following conditional expression (8). By not allowing the result of the conditional expression (8) to be equal to or less than the lower limit, it is possible to prevent the effects of correction of astigmatism and chromatic aberration from becoming weak. By not allowing the result of the conditional expression (8) to be equal to or greater than the upper limit, it becomes easy to prevent astigmatism from being excessively corrected. In order to enhance the effect relating to the conditional expression (8), it is more preferable that the following conditional expression (8-1) is satisfied.

$$0.1 < |fw|/Rc1 < 0.168 \tag{8}$$

$$0.105 < |fw|/Rc1 < 0.163 \tag{8-1}$$

Here, fw is a focal length of the whole system at the wide-angle end, and

Rc1 is a radius of curvature of a cemented surface close to the reduction side within the first cemented lens CL1.

It is preferable that the zoom lens satisfies the following conditional expression (9). By not allowing the result of the conditional expression (9) to be equal to or less than the lower limit, it becomes easy to suppress spherical aberration. By not allowing the result of the conditional expression (9) to be equal to or greater than the upper limit, there is an advantage of minimizing the total length of the lens system. In order to enhance the effect relating to the conditional expression (9), it is more preferable that the following conditional expression (9-1) is satisfied.

$$0 < |fw|/Rc2 < 0.2 \tag{9}$$

$$0.02 < |fw|/Rc2 < 0.18 \tag{9-1}$$

Here, fw is a focal length of the whole system at the wide-angle end, and

Rc2 is a radius of curvature of a surface of the second cemented lens CL2 closest to the reduction side.

It is preferable that the zoom lens has a lens at a position closer to the reduction side than the second cemented lens CL2. In this case, it is preferable that the zoom lens satisfies the following conditional expression (10). By not allowing the result of the conditional expression (10) to be equal to or less than the lower limit, it is possible to suppress the occurrence of spherical aberration. By not allowing the result of the conditional expression (10) to be equal to or greater than the upper limit, it is possible to control the pupil position, and thus it becomes easy to balance on-axis aberrations and off-axis aberrations. In order to enhance the effect relating to the conditional expression (10), it is more preferable that the following conditional expression (10-1) is satisfied.

$$0.2 < d12/d2r < 0.7 \tag{10}$$

$$0.3 < d12/d2r < 0.6 \tag{10-1}$$

Here, d12 is a spacing on the optical axis between a lens surface of the first optical system 1 closest to the reduction side and a lens surface of the second optical system 2 closest to the magnification side, and d2r is a spacing on the optical axis between a lens, which is continuously disposed with the second cemented lens CL2 on the reduction side of the second cemented lens CL2, and the second cemented lens CL2.

Further, in the case where the zoom lens has a lens at a position closer to the reduction side than the second cemented lens CL2, it is preferable that the zoom lens satisfies the following conditional expression (11). By not allowing the result of the conditional expression (11) to be equal to or less than the lower limit, it is possible to suppress the occurrence of spherical aberration. By not allowing the result of the conditional expression (11) to be equal to or greater than the upper limit, it is possible to control the pupil position, and thus it becomes easy to balance the on-axis aberrations and off-axis aberrations. In order to enhance the effect relating to the conditional expression (11), it is more preferable that the following conditional expression (11-1) is satisfied.

$$1.5 < d2r/Ymax < 5 \quad (11)$$

$$1.9 < d2r/Ymax < 4.6 \quad (11\text{-}1)$$

Here, d2 r is a spacing on the optical axis between a lens, which is continuously disposed with the second cemented lens CL2 on the reduction side of the second cemented lens CL2, and the second cemented lens CL2, and Ymax is a maximum image height on the reduction side.

It is preferable that the zoom lens satisfies the following conditional expression (12). By not allowing the result of the conditional expression (12) to be equal to or less than the lower limit, there is an advantage of minimizing the total length of the lens system. By not allowing the result of the conditional expression (12) to be equal to or greater than the upper limit, it becomes easy to suppress the field curvature. In order to enhance the effect relating to the conditional expression (12), it is more preferable that the following conditional expression (12-1) is satisfied.

$$0.2 < |fw|/f1 < 1 \quad (12)$$

$$0.25 < |fw|/f1 < 0.95 \quad (12\text{-}1)$$

Here, fw is a focal length of the whole system at the wide-angle end, and f1 is a focal length of the first optical system 1 at the wide-angle end.

It is preferable that the zoom lens satisfies the following conditional expression (13). By not allowing the result of the conditional expression (13) to be equal to or less than the lower limit, there is an advantage of minimizing the total length of the lens system. By not allowing the result of the conditional expression (13) to be equal to or greater than the upper limit, it becomes easy to suppress the field curvature. In order to enhance the effect relating to the conditional expression (13), it is more preferable that the following conditional expression (13-1) is satisfied.

$$0 < |fw|/f2 < 0.15 \quad (13)$$

$$0.005 < |fw|/f2 < 0.145 \quad (13\text{-}1)$$

Here, fw is a focal length of the whole system at the wide-angle end, and f2 is a focal length of the second optical system 2 at the wide-angle end.

The above-mentioned preferred configurations and available configurations may be arbitrary combinations, and it is preferable to selectively adopt the configurations in accordance with the required specification. According to the present embodiment, it is possible to realize a high optical performance zoom lens that has a small F number with a wide angle. It should be noted that the term "small F number" described herein means that the F number is smaller than 2.4, and the term "wide angle" means that the total angle of view is greater than 120°.

Next, numerical examples of the zoom lens of the present invention will be described.

EXAMPLE 1

A lens configuration and an optical path of a zoom lens of Example 1 are shown in FIG. 1, and a configuration and an illustration method thereof is as described above. Therefore, repeated descriptions are partially omitted herein. The zoom lens of Example 1 includes, in order from the magnification side, a first optical system 1 and a second optical system 2. The second optical system 2 forms an intermediate image MI at a position conjugate to an image display surface Sim, and the first optical system 1 causes the intermediate image MI to be re-imaged on a screen Scr. The first optical system 1 includes, in order from the magnification side: a first lens group G1 that has a negative refractive power; a second lens group G2 that has a positive refractive power; a third lens group G3 that has a positive refractive power; a fourth lens group G4 that has a positive refractive power; and a fifth lens group G5 that has a positive refractive power. During zooming, the first lens group G1, the fifth lens group G5, and the second optical system 2 remain stationary, and the second lens group G2, the third lens group G3, and the fourth lens group G4 moves along loci different from one another.

Table 1 shows basic lens data of the zoom lens of Example 1, Table 2 shows various kinds of data, and Table 3 shows aspheric coefficients thereof. In Table 1, the column of Si shows i-th (i=1, 2, 3, . . . ) surface number. The i-th surface number is attached to each of surfaces of the elements, where i sequentially increases toward the reduction side in a case where a magnification side surface of an element closest to the magnification side is regarded as a first surface. The column of Ri shows a radius of curvature of the i-th surface. The column of Di shows a surface spacing on the optical axis between the i-th surface and an (i+1)th surface. In Table 1, the column of Ndj shows a refractive index of a j-th (j=1, 2, 3, . . . ) element at the d line (a wavelength of 587.6 nm), where j sequentially increases toward the reduction side in a case where the element closest to the magnification side is regarded as the first element. The column of vdj shows an Abbe number of the j-th element on the basis of the d line.

Here, signs of radii of curvature of surface shapes convex toward the magnification side are set to be positive, and signs of radii of curvature of surface shapes convex toward the reduction side are set to be negative. Table 1 additionally shows the optical member PP. In Table 1, the variable surface spacings, which are variable during zooming, are referenced by the reference signs DD[ ], and are written into places of Di, where magnification side surface numbers of spacings are noted in [ ].

In the range of Table 2, values of the zoom ratio Zr, the absolute value |f| of the focal length of the whole system, the F number FNo., the maximum total angle of view 2ω, and the variable surface spacing are based on the d line. (°) in the place of 2ω indicates that the unit thereof is a degree. In Table 2, values at the wide-angle end state are shown in the column labeled by WIDE, and values at the telephoto end state are shown in the column labeled by TELE.

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E±n" (n: an integer) in numerical values of the aspheric coefficients of Table 3 indicates "×10$^{\pm n}$". The aspheric coefficients are values of the coefficients KA and Am (m is an integer equal to or greater than 3, and is different for each surface) in aspheric surface expression represented by the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

In the data of each table, degree is used as the unit of an angle, and mm is used as the unit of a length, but appropriate different units may be used since the optical system can be used even in a case where the system is enlarged or reduced in proportion. Further, each of the following tables shows numerical values rounded off to predetermined decimal places.

TABLE 1

EXAMPLE 1

| Si | Ri | Di | Ndj | vdj |
|---|---|---|---|---|
| *1 | −33.7545 | 4.6577 | 1.49100 | 57.58 |
| *2 | 8774.2423 | 6.4431 | | |
| 3 | 82.8514 | 2.9003 | 1.65160 | 58.55 |
| 4 | 31.5052 | 10.7528 | | |
| 5 | 91.3359 | 2.1004 | 1.88300 | 40.80 |
| 6 | 21.7940 | 11.5382 | | |
| 7 | −2270.2574 | 1.6006 | 1.55032 | 75.50 |
| 8 | 93.7153 | 3.5427 | | |

TABLE 1-continued

EXAMPLE 1

| Si | Ri | Di | Ndj | vdj |
|---|---|---|---|---|
| *9 | 37.9561 | 5.7600 | 1.49700 | 81.54 |
| *10 | 35.4716 | 3.9433 | | |
| 11 | −316.1448 | 7.8804 | 1.84666 | 23.78 |
| 12 | −283.6970 | DD [12] | | |
| 13 | 165.7776 | 5.0217 | 1.65160 | 58.55 |
| 14 | −80.7911 | 0.4005 | | |
| 15 | 143.2131 | 3.0002 | 1.55032 | 75.50 |
| 16 | −246.8528 | DD [16] | | |
| 17 | 85.4495 | 10.3523 | 1.65160 | 58.55 |
| 18 | −60.8542 | 0.2838 | | |
| 19 | 81.8067 | 14.9412 | 1.61997 | 63.88 |
| 20 | −33.7235 | 2.9190 | 1.76182 | 26.52 |
| 21 | 35.1867 | 11.2572 | 1.49700 | 81.54 |
| 22 | 1139.3782 | DD [22] | | |
| *23 | −53.9733 | 4.5537 | 1.84666 | 23.78 |
| *24 | −52.2615 | DD [24] | | |
| 25 | 319.4043 | 18.3273 | 2.00178 | 19.32 |
| 26 | −114.2512 | 26.3432 | | |
| 27 | 56.6691 | 2.7986 | 1.88300 | 40.80 |
| 28 | 27.5298 | 16.4469 | 1.80518 | 25.46 |
| 29 | 56.4403 | 55.9519 | | |
| 30 | 200.3765 | 8.5555 | 1.84666 | 23.78 |
| 31 | −103.4305 | 68.5472 | | |
| 32 | 30.6253 | 4.1931 | 1.83481 | 42.72 |
| 33 | 886.4823 | 1.0850 | | |
| 34 | −760.6660 | 1.2000 | 1.60342 | 38.01 |
| 35 | 21.3021 | 9.2849 | | |
| 36 | −23.4872 | 1.2004 | 1.80518 | 25.46 |
| 37 | 107.8864 | 6.2196 | 1.55032 | 75.50 |
| 38 | −28.9220 | 0.2005 | | |
| 39 | 93.1084 | 7.6688 | 1.49700 | 81.54 |
| 40 | −36.5956 | 29.0750 | | |
| 41 | 54.8800 | 13.5193 | 1.89286 | 20.36 |
| 42 | 762.1459 | 13.1000 | | |
| 43 | ∞ | 32.3000 | 1.51633 | 64.14 |
| 44 | ∞ | | | |

TABLE 2

EXAMPLE 1

| | WIDE | TELE |
|---|---|---|
| Zr | 1.0 | 1.1 |
| |f| | 5.68 | 6.24 |
| FNo. | 1.99 | 1.99 |
| 2ω (°) | 137.0 | 133.2 |
| DD [12] | 3.52 | 0.64 |
| DD [16] | 51.36 | 48.26 |
| DD [22] | 10.45 | 14.03 |
| DD [24] | 1.56 | 3.96 |

TABLE 3

EXAMPLE 1

| | SURFACE NUMBER | | | |
|---|---|---|---|---|
| | 1 | 2 | 9 | 10 |
| KA | −1.2861410E+00 | 2.6985540E+04 | 1.0000000E+00 | 1.0000000E+00 |
| A3 | 3.7696758E−04 | 8.0671402E−04 | 0.0000000E+00 | 0.0000000E+00 |
| A4 | 1.6795005E−05 | −1.6300080E−04 | −4.9722988E−05 | −5.0765198E−05 |
| A5 | −1.1297124E−06 | 3.2311074E−05 | −8.2870156E−07 | 2.3084755E−06 |
| A6 | 1.8031143E−08 | −4.4911458E−06 | 4.3235706E−07 | 8.7553592E−08 |
| A7 | 3.5362746E−10 | 4.3693966E−07 | −1.6479538E−08 | −1.3873767E−08 |
| A8 | −1.6549243E−11 | −3.0236478E−08 | −1.3743295E−09 | 2.3985940E−10 |
| A9 | 7.3769434E−14 | 1.5156855E−09 | 1.1438027E−10 | 3.1812848E−11 |
| A10 | 6.3582032E−15 | −5.5693748E−11 | −1.5758332E−13 | −1.1655003E−12 |
| A11 | −1.0687955E−16 | 1.5018108E−12 | −1.8762842E−13 | −2.5921748E−14 |
| A12 | −7.0004535E−19 | −2.9377786E−14 | 4.3975807E−15 | 1.2532300E−15 |

TABLE 3-continued

EXAMPLE 1

| | | |
|---|---|---|
| A13 | 3.0564451E−20 | 4.0543628E−16 |
| A14 | −1.1684898E−22 | −3.7399318E−18 |
| A15 | −2.8395200E−24 | 2.0678708E−20 |
| A16 | 2.3282706E−26 | −5.1792265E−23 |

| | SURFACE NUMBER | |
|---|---|---|
| | 23 | 24 |
| KA | 1.0000000E+00 | 1.0000000E+00 |
| A3 | −2.8474225E−20 | 0.0000000E+00 |
| A4 | 7.7525770E−06 | 1.6846161E−05 |
| A5 | −9.2140729E−07 | −1.6987328E−06 |
| A6 | −3.2446659E−09 | 6.4563536E−08 |
| A7 | −1.2673561E−09 | 2.9162065E−10 |
| A8 | 2.9886770E−10 | −2.1551331E−10 |
| A9 | −1.4835091E−12 | 9.7485839E−12 |
| A10 | −1.6294031E−12 | 1.8132581E−13 |
| A11 | 5.6383423E−14 | −2.1893557E−14 |
| A12 | 2.8808734E−15 | 1.8203714E−18 |
| A13 | −1.6197039E−16 | 2.2593941E−17 |
| A14 | −1.8943028E−18 | −5.3780220E−20 |
| A15 | 1.7583613E−19 | −1.1699419E−20 |
| A16 | 3.3076555E−22 | 1.4394519E−23 |
| A17 | −6.7514725E−23 | 2.4292114E−24 |

Figure 4:
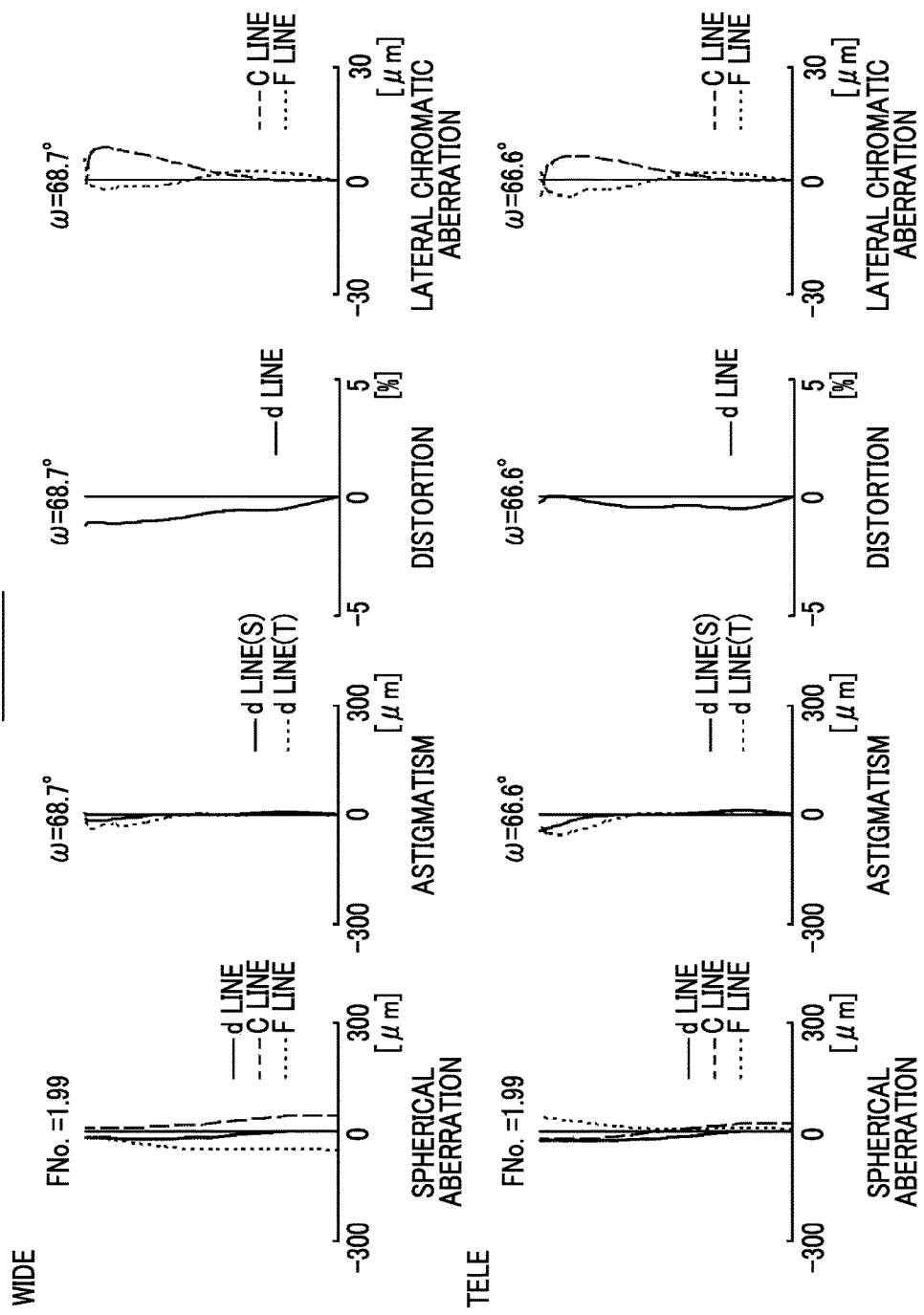
FIG. 4 is a diagram of aberrations of the zoom lens of Example 1 of the present invention.

FIG. 4 shows aberration diagrams of spherical aberration, astigmatism, distortion, and lateral chromatic aberration (chromatic aberration of magnification) of the zoom lens of Example 1, in order from the left side. In FIG. 4, aberrations at the wide-angle end state are shown in the upper part indicated by WIDE, and aberrations at the telephoto end state are shown in the lower part indicated by TELE. In the spherical aberration diagram, aberrations at the d-line (a wavelength of 587.6 nm), the C-line (a wavelength of 656.3 nm), and the F-line (a wavelength of 486.1 nm) are respectively indicated by a solid line, a long dashed line, and a short dashed line. In the astigmatism diagram, aberration in the sagittal direction at the d line is indicated by a solid line, and aberration in the tangential direction at the d line is indicated by a short dashed line. In the distortion diagram, aberration at the d line is indicated by a solid line. In the lateral chromatic aberration diagram, aberrations at the C line and the F line are respectively indicated by a long dashed line and a short dashed line. In the spherical aberration diagram, FNo. indicates an F number. In the other aberration diagrams, ω indicates a half angle of view. These aberration diagrams are diagrams of aberrations in a case where a distance on the optical axis from the lens surface closest to the magnification side to the magnification side imaging plane is 1.1m, and this point is the same for those in the following examples.

Reference signs, meanings, and description methods of the respective data pieces according to Example 1 mentioned above are the same as those in the following examples unless otherwise noted. Therefore, in the following descriptions, repeated descriptions will be omitted.

EXAMPLE 2

Figure 2:
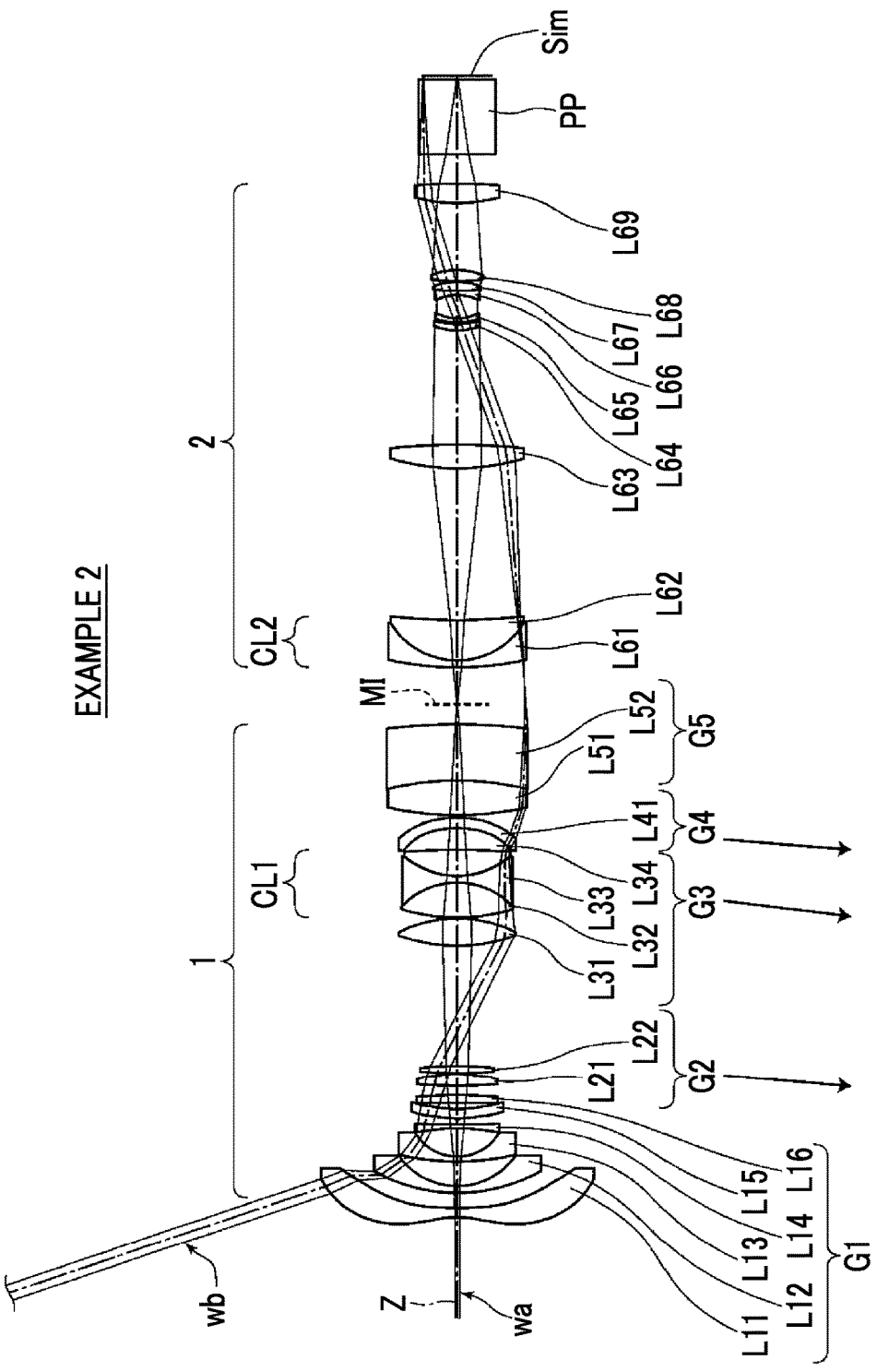
FIG. 2 is a cross-sectional view illustrating a configuration and an optical path of a zoom lens of Example 2 of the present invention.

FIG. 2 is a cross-sectional diagram of a lens configuration and an optical path of a zoom lens of Example 2. The zoom lens of Example 2 includes, in order from the magnification side, a first optical system 1 and a second optical system 2. The second optical system 2 forms an intermediate image MI at a position conjugate to an image display surface Sim, and the first optical system 1 causes the intermediate image MI to be re-imaged on a screen Scr. The first optical system 1 includes, in order from the magnification side, five lens groups as the first to fifth lens groups G1 to G5. The present example is the same as Example 1 in terms of the signs of refractive powers of the five lens groups, the lens groups moving during zooming, and the second optical system 2 remaining stationary during zooming.

The first lens group G1 includes, in order from the magnification side, six lenses as lenses L11 to L16, the second lens group G2 includes, in order from the magnification side, two lenses as lenses L21 and L22, the third lens group G3 includes, in order from the magnification side, four lenses as lenses L31 to L34 , the fourth lens group G4 includes only one lens as a lens L41, and the fifth lens group G5 includes, in order from the magnification side, two lenses as lenses L51 and L52 . The second optical system 2 includes, in order from the magnification side, nine lenses as lenses L61 to L69.

Figure 5:
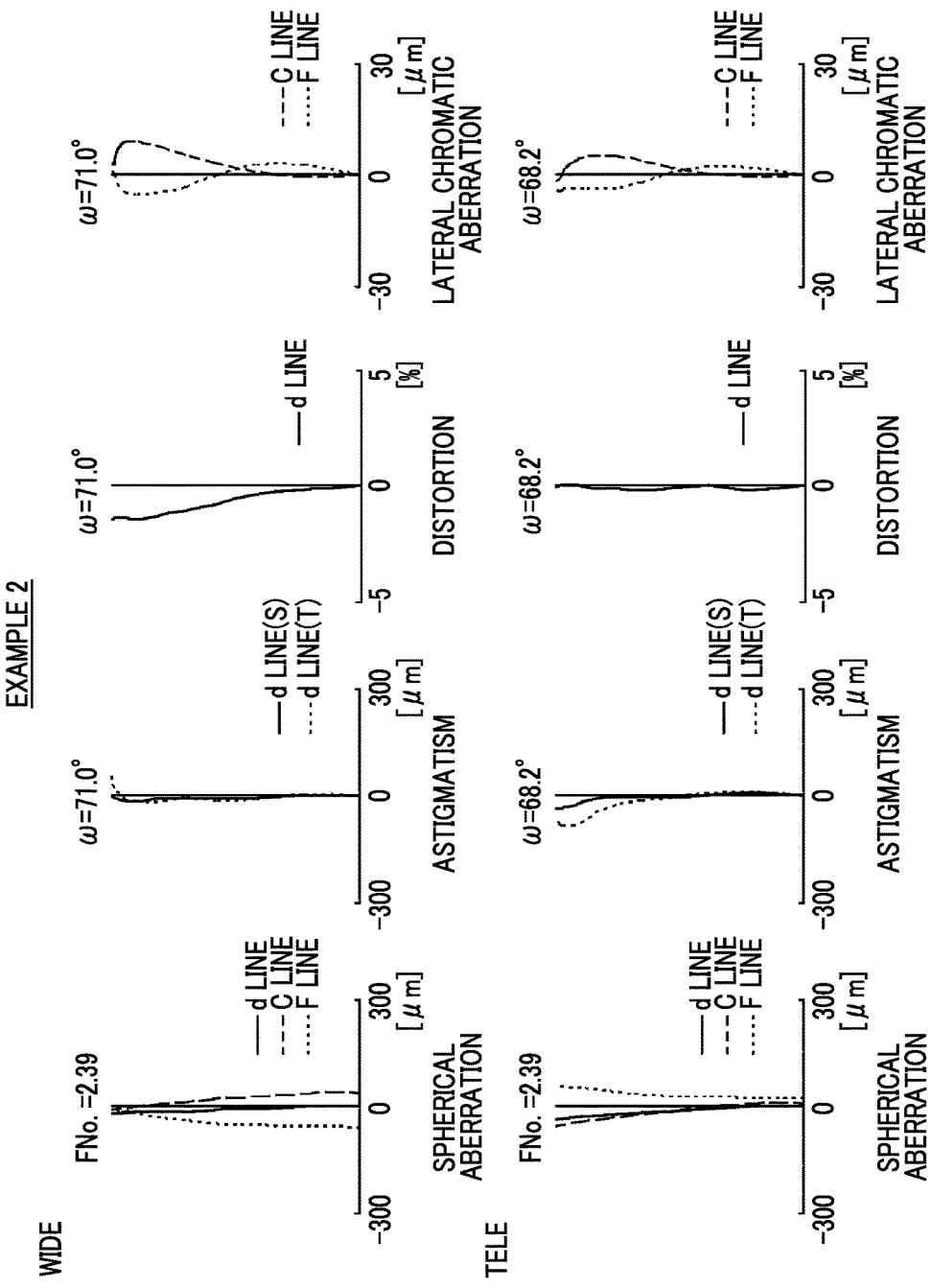
FIG. 5 is a diagram of aberrations of the zoom lens of Example 2 of the present invention.

Table 4 shows basic lens data of the zoom lens of Example 2, Table 5 shows various kinds of data, Table 6 shows aspheric coefficients, and FIG. 5 shows aberration diagrams.

TABLE 4

EXAMPLE 2

| Si | Ri | Di | Ndj | νdj |
|---|---|---|---|---|
| *1 | −29.4585 | 4.1300 | 1.49100 | 57.58 |
| *2 | −2492.2423 | 6.3937 | | |
| 3 | 71.7237 | 2.9137 | 1.85150 | 40.78 |
| 4 | 29.9559 | 10.6387 | | |
| 5 | 108.1162 | 2.1004 | 1.83481 | 42.72 |
| 6 | 20.6620 | 12.1807 | | |
| 7 | −92.1384 | 1.6009 | 1.55032 | 75.50 |
| 8 | 378.6657 | 2.7362 | | |
| *9 | 43.2651 | 3.9999 | 1.49700 | 81.54 |
| *10 | 40.7953 | 2.6336 | | |
| 11 | 1565.1006 | 3.3896 | 1.84666 | 23.78 |
| 12 | −256.9553 | DD [12] | | |
| 13 | 240.4734 | 5.0003 | 1.59522 | 67.73 |
| 14 | −71.3812 | 0.3991 | | |
| 15 | 143.7286 | 3.0663 | 1.49700 | 81.54 |

TABLE 4-continued

EXAMPLE 2

| Si | Ri | Di | Ndj | vdj |
|---|---|---|---|---|
| 16 | −201.9892 | DD [16] | | |
| 17 | 72.4159 | 11.8092 | 1.59522 | 67.73 |
| 18 | −54.2040 | 0.4554 | | |
| 19 | 81.5854 | 15.0092 | 1.59522 | 67.73 |
| 20 | −32.3397 | 2.9407 | 1.76182 | 26.52 |
| 21 | 33.7812 | 11.2837 | 1.49700 | 81.54 |
| 22 | −282.3515 | DD [22] | | |
| *23 | −37.7982 | 4.5822 | 1.84666 | 23.78 |
| *24 | −36.6855 | DD [24] | | |
| 25 | 134.0363 | 14.9120 | 2.00178 | 19.32 |
| 26 | −121.6346 | 24.3251 | 1.95375 | 32.32 |
| 27 | −238.1156 | 24.8503 | | |
| 28 | 129.9653 | 2.9990 | 1.74100 | 52.64 |
| 29 | 32.7660 | 17.5209 | 1.69895 | 30.05 |
| 30 | 247.6037 | 65.6077 | | |
| 31 | 98.0703 | 10.1673 | 1.84666 | 23.78 |
| 32 | −253.9366 | 50.0622 | | |
| 33 | 26.9766 | 2.5148 | 1.76450 | 49.10 |
| 34 | 43.1995 | 0.7055 | | |
| 35 | 33.8464 | 1.6955 | 1.54814 | 45.82 |
| 36 | 18.7407 | 9.9675 | | |
| 37 | −20.2502 | 1.8592 | 1.80518 | 25.46 |
| 38 | 97.8931 | 3.8648 | 1.53775 | 74.70 |
| 39 | −26.7859 | 0.3960 | | |
| 40 | 114.2982 | 4.7411 | 1.49700 | 81.54 |
| 41 | −27.9488 | 28.8959 | | |
| 42 | 67.4869 | 8.4171 | 1.89286 | 20.36 |
| 43 | −222.4731 | 13.1000 | | |
| 44 | ∞ | 32.3000 | 1.51633 | 64.14 |
| 45 | ∞ | | | |

TABLE 5

EXAMPLE 2

| | WIDE | TELE |
|---|---|---|
| Zr | 1.0 | 1.2 |
| |f| | 5.01 | 5.74 |
| FNo. | 2.39 | 2.39 |
| 2ω (°) | 143.0 | 136.8 |
| DD [12] | 4.31 | 0.11 |
| DD [16] | 52.09 | 47.70 |
| DD [22] | 9.40 | 14.68 |
| DD [24] | 1.08 | 4.40 |

TABLE 6

EXAMPLE 2

| | SURFACE NUMBER | | | |
|---|---|---|---|---|
| | 1 | 2 | 9 | 10 |
| KA | −1.2912711E+00 | −1.8500395E+03 | 1.0000000E+00 | 1.0000000E+00 |
| A3 | 3.6032868E−04 | 7.5422512E−04 | 0.0000000E+00 | 4.7112950E−21 |
| A4 | 1.7088675E−05 | −1.7632704E−04 | −4.8747698E−05 | −4.5332153E−05 |
| A5 | −1.1416377E−06 | 3.4717592E−05 | −9.5877103E−07 | 1.0050798E−06 |
| A6 | 1.8206250E−08 | −4.8647529E−06 | 4.3856206E−07 | 1.5474467E−07 |
| A7 | 3.7703402E−10 | 4.8039805E−07 | −7.4477266E−09 | −2.8742778E−09 |
| A8 | −1.7095162E−11 | −3.3713768E−08 | −1.6563913E−09 | −4.1544197E−10 |
| A9 | 5.7249127E−14 | 1.7127979E−09 | 7.8448707E−11 | −4.6133847E−13 |
| A10 | 6.8472635E−15 | −6.3790552E−11 | 1.0898149E−12 | 7.7799274E−13 |
| A11 | −1.0260434E−16 | 1.7437647E−12 | −1.4893105E−13 | 5.5385687E−15 |
| A12 | −8.8190880E−19 | −3.4579173E−14 | 3.0169808E−15 | −6.2417849E−16 |
| A13 | 3.0310415E−20 | 4.8372380E−16 | | |
| A14 | −8.7051173E−23 | −4.5227263E−18 | | |
| A15 | −2.8690114E−24 | 2.5350813E−20 | | |
| A16 | 2.1565712E−26 | −6.4395922E−23 | | |

| | SURFACE NUMBER | |
|---|---|---|
| | 23 | 24 |
| KA | 1.0000000E+00 | 1.0000000E+00 |
| A3 | −8.9977541E−20 | −5.4377427E−20 |
| A4 | 1.7904292E−05 | 2.4405835E−05 |
| A5 | −5.5251603E−07 | −1.0218578E−06 |
| A6 | −5.1436483E−08 | 1.3564014E−08 |
| A7 | −5.9612450E−09 | −3.8700229E−09 |
| A8 | 5.0621949E−10 | −3.3055796E−11 |
| A9 | 1.6210119E−11 | 2.2643380E−11 |
| A10 | −2.2466291E−12 | −1.9703502E−13 |
| A11 | 2.9799219E−14 | −4.3810046E−14 |
| A12 | 3.8697521E−15 | 4.3052283E−16 |
| A13 | −1.5654083E−16 | 4.3734812E−17 |
| A14 | −2.6031413E−18 | −2.9203415E−19 |
| A15 | 1.9820510E−19 | −2.2613412E−20 |
| A16 | 4.9078184E−22 | 6.4484623E−23 |
| A17 | −8.2594729E−23 | 4.7648289E−24 |

EXAMPLE 3

Figure 3:
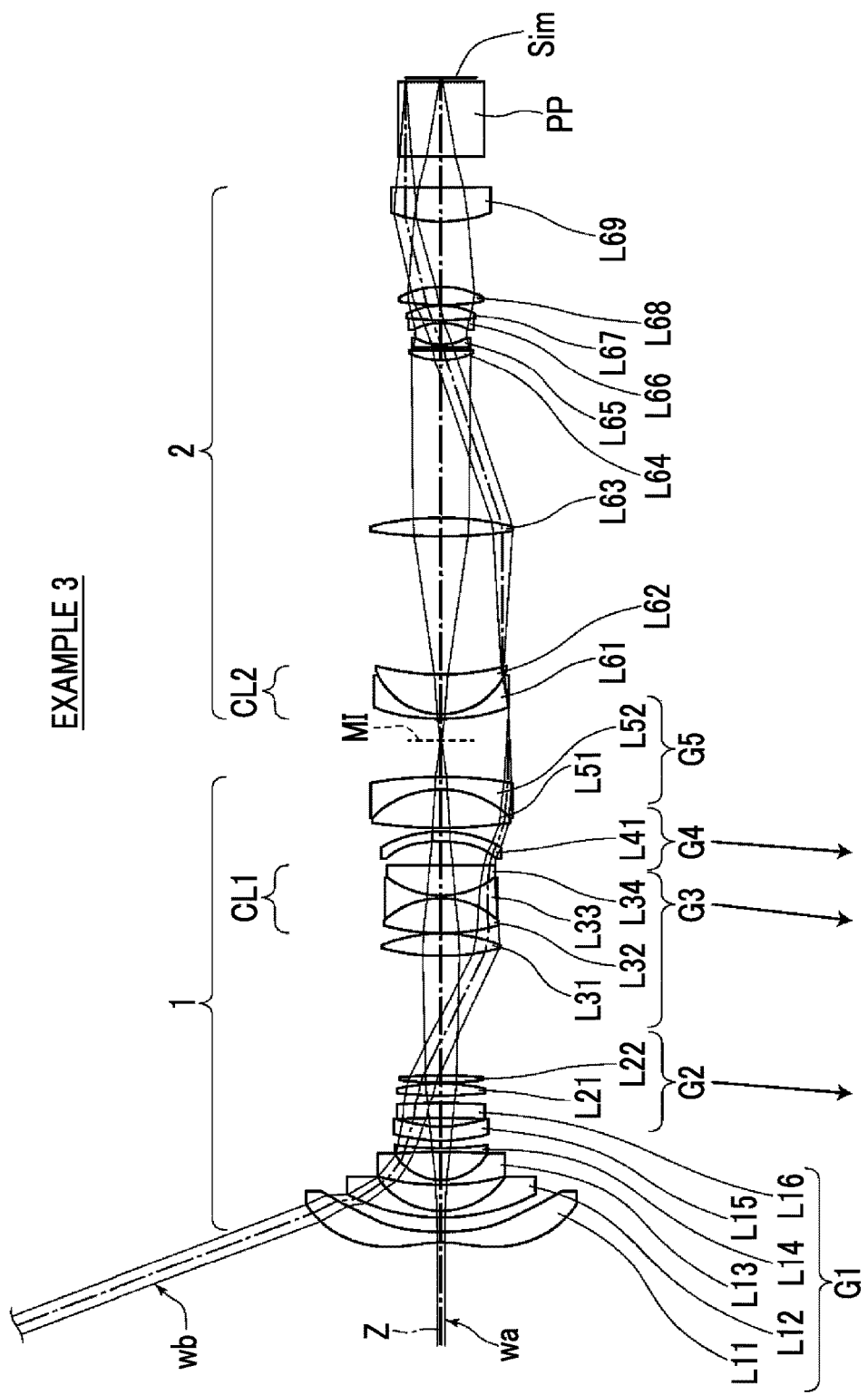
FIG. 3 is a cross-sectional view illustrating a configuration and an optical path of a zoom lens of Example 3 of the present invention.

FIG. 3 is a cross-sectional diagram of a lens configuration and an optical path of a zoom lens of Example 3. The zoom lens of Example 3 includes, in order from the magnification side, a first optical system 1 and a second optical system 2. The second optical system 2 forms an intermediate image MI at a position conjugate to an image display surface Sim, and the first optical system 1 causes the intermediate image MI to be re-imaged on a screen Scr. The first optical system 1 includes, in order from the magnification side, five lens groups as the first to fifth lens groups G1 to G5. The present example is the same as Example 1 in terms of the signs of refractive powers of the five lens groups, the lens groups moving during zooming, and the second optical system 2 remaining stationary during zooming.

The first lens group G1 includes, in order from the magnification side, six lenses as lenses L11 to L16, the second lens group G2 includes, in order from the magnification side, two lenses as lenses L21 and L22, the third lens group G3 includes, in order from the magnification side, four lenses as lenses L31 to L34, the fourth lens group G4 includes only one lens as a lens L41, and the fifth lens group G5 includes, in order from the magnification side, two lenses as lenses L51 and L52. The second optical system 2 includes, in order from the magnification side, nine lenses as lenses L61 to L69.

Figure 6:
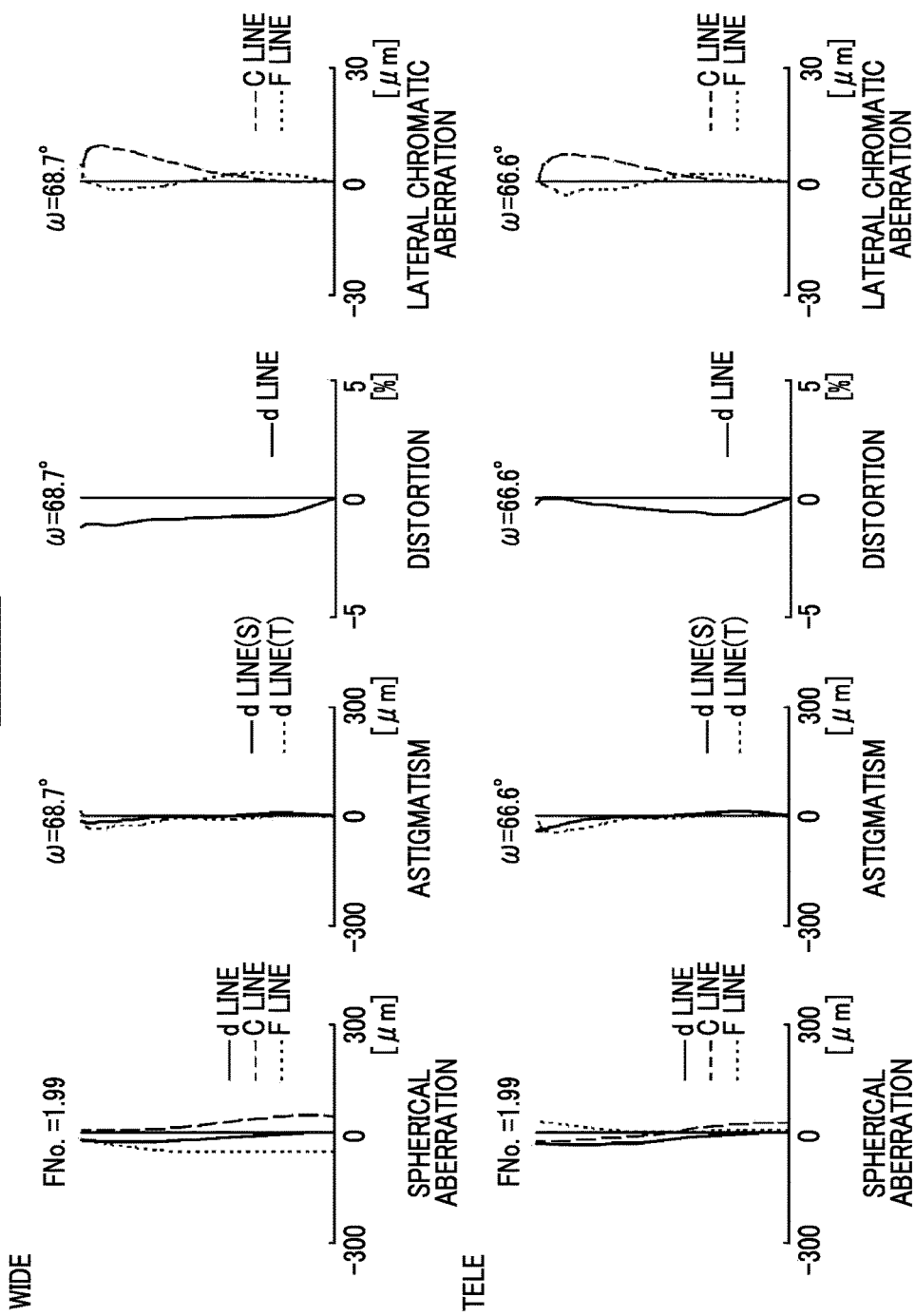
FIG. 6 is a diagram of aberrations of the zoom lens of Example 3 of the present invention.

Table 7 shows basic lens data of the zoom lens of Example 3, Table 8 shows various kinds of data, Table 9 shows aspheric coefficients, and FIG. 6 shows aberration diagrams.

TABLE 7

EXAMPLE 3

| Si | Ri | Di | Ndj | vdj |
|---|---|---|---|---|
| *1 | −33.3549 | 4.5423 | 1.49100 | 57.58 |
| *2 | −5065.3700 | 5.9902 | | |
| 3 | 80.9847 | 2.9010 | 1.67289 | 57.84 |
| 4 | 31.1782 | 11.0876 | | |
| 5 | 97.8819 | 2.0995 | 1.87193 | 39.80 |
| 6 | 21.6735 | 12.0505 | | |
| 7 | −289.0575 | 1.6009 | 1.53775 | 74.70 |
| 8 | 134.9108 | 3.0401 | | |
| *9 | 37.9607 | 5.9955 | 1.49700 | 81.54 |
| *10 | 35.1417 | 3.7688 | | |
| 11 | −332.3341 | 6.4602 | 1.84666 | 23.78 |
| 12 | −296.9769 | DD [12] | | |

TABLE 7-continued

EXAMPLE 3

| Si | Ri | Di | Ndj | vdj |
|---|---|---|---|---|
| 13 | 160.5621 | 5.0435 | 1.66658 | 57.80 |
| 14 | −78.2672 | 0.4009 | | |
| 15 | 137.7917 | 3.0005 | 1.53775 | 74.70 |
| 16 | −247.4245 | DD [16] | | |
| 17 | 88.9585 | 9.5795 | 1.66912 | 58.04 |
| 18 | −63.1975 | 0.2710 | | |
| 19 | 84.9746 | 14.8103 | 1.64170 | 59.32 |
| 20 | −33.7900 | 1.3076 | 1.76182 | 26.52 |
| 21 | 35.1789 | 12.7344 | 1.49700 | 81.54 |
| 22 | 2804.1075 | DD [22] | | |
| *23 | −49.2178 | 4.1449 | 1.84666 | 23.78 |
| *24 | −46.9466 | DD [24] | | |
| 25 | 185.4147 | 16.4474 | 2.00178 | 19.32 |
| 26 | −39.2914 | 5.3619 | 1.99984 | 18.38 |
| 27 | −167.0131 | 24.9991 | | |
| 28 | 80.6589 | 2.1255 | 1.86759 | 40.72 |
| 29 | 29.1257 | 16.5628 | 1.80518 | 25.46 |
| 30 | 100.5940 | 58.9828 | | |
| 31 | 187.0421 | 8.0396 | 1.84666 | 23.78 |
| 32 | −116.9031 | 67.9077 | | |
| 33 | 30.2047 | 4.1094 | 1.84037 | 43.83 |
| 34 | 396.8352 | 1.3786 | | |
| 35 | −1600.5607 | 1.2010 | 1.59970 | 38.05 |
| 36 | 20.8952 | 9.2315 | | |
| 37 | −23.0272 | 1.2010 | 1.80518 | 25.46 |
| 38 | 114.2380 | 6.2730 | 1.53775 | 74.70 |
| 39 | −28.2632 | 0.2002 | | |
| 40 | 95.2262 | 7.7187 | 1.49700 | 81.54 |
| 41 | −35.5043 | 27.9785 | | |
| 42 | 56.1707 | 14.7266 | 1.89286 | 20.36 |
| 43 | 1347.2328 | 13.1000 | | |
| 44 | ∞ | 32.3000 | 1.51633 | 64.14 |
| 45 | ∞ | | | |

TABLE 8

EXAMPLE 3

| | WIDE | TELE |
|---|---|---|
| Zr | 1.0 | 1.1 |
| \|f\| | 5.68 | 6.23 |
| FNo. | 1.99 | 1.99 |
| 2ω (°) | 137.6 | 133.4 |
| DD [12] | 3.51 | 0.63 |
| DD [16] | 51.40 | 48.23 |
| DD [22] | 10.41 | 14.07 |
| DD [24] | 1.56 | 3.96 |

TABLE 9

EXAMPLE 3

| | SURFACE NUMBER | | | |
|---|---|---|---|---|
| | 1 | 2 | 9 | 10 |
| KA | −1.2948160E+00 | −2.2187609E+05 | 1.0000000E+00 | 1.0000000E+00 |
| A3 | 3.8495583E−04 | 8.3422330E−04 | 0.0000000E+00 | 0.0000000E+00 |
| A4 | 1.7093955E−05 | −1.6972515E−04 | −5.3337724E−05 | −5.4366593E−05 |
| A5 | −1.1419364E−06 | 3.3809060E−05 | −2.1633597E−07 | 2.8117472E−06 |
| A6 | 1.7646960E−08 | −4.7388093E−06 | 4.2041060E−07 | 9.3637861E−08 |
| A7 | 3.6676536E−10 | 4.6523031E−07 | −1.9976629E−08 | −1.8225813E−08 |
| A8 | −1.6315028E−11 | −3.2487696E−08 | −1.1634782E−09 | 3.4854173E−10 |
| A9 | 6.5869236E−14 | 1.6432282E−09 | 1.1691898E−10 | 4.5037726E−11 |
| A10 | 6.2753375E−15 | −6.0923114E−11 | −6.2289505E−13 | −1.6734619E−12 |
| A11 | −1.0417214E−16 | 1.6576225E−12 | −1.7773914E−13 | −3.9678810E−14 |
| A12 | −6.8315011E−19 | −3.2718403E−14 | 4.3864774E−15 | 1.8869230E−15 |
| A13 | 3.0068761E−20 | 4.5561276E−16 | | |
| A14 | −1.1860419E−22 | −4.2406242E−18 | | |

TABLE 9-continued

EXAMPLE 3

| | | |
|---|---|---|
| A15 | −2.8017814E−24 | 2.3658302E−20 |
| A16 | 2.3349391E−26 | −5.9792079E−23 |

| | SURFACE NUMBER | |
|---|---|---|
| | 23 | 24 |
| KA | 1.0000000E+00 | 1.0000000E+00 |
| A3 | 2.8413466E−20 | 0.0000000E+00 |
| A4 | 6.4686300E−06 | 1.4247929E−05 |
| A5 | −5.4702603E−07 | −1.1097802E−06 |
| A6 | 1.3660452E−08 | 6.4593671E−08 |
| A7 | −3.9280151E−09 | −2.5927254E−09 |
| A8 | 2.1620998E−10 | −1.7695249E−10 |
| A9 | 9.7121149E−12 | 1.7291644E−11 |
| A10 | −1.4127123E−12 | 6.0787056E−14 |
| A11 | 2.9197135E−14 | −3.3286021E−14 |
| A12 | 2.5948482E−15 | 1.5820836E−16 |
| A13 | −1.2403146E−16 | 3.2637351E−17 |
| A14 | −1.7305295E−18 | −1.4542159E−19 |
| A15 | 1.4738956E−19 | −1.6509745E−20 |
| A16 | 3.0568342E−22 | 3.4204453E−23 |
| A17 | −5.8630219E−23 | 3.3936482E−24 |

Table 10 shows values corresponding to the conditional expressions (1) to (13) of the zoom lenses of Examples 1 to 3. The values shown in Table 10 are based on the d line.

TABLE 10

| EXPRESSION NUMBER | | EXAMPLE 1 | EXAMPLE 2 | EXAMPLE 3 |
|---|---|---|---|---|
| (1) | ν2n − ν2p | 15.35 | 22.59 | 15.27 |
| (2) | ν11 − ν12 | 37.36 | 41.22 | 32.80 |
| (3) | ν13 − ν12 | 55.02 | 55.02 | 55.02 |
| (4) | \|fw\|/fc1 | −0.022 | −0.017 | −0.018 |
| (5) | \|fw\|/fc11 | 0.141 | 0.123 | 0.144 |
| (6) | \|fw\|/fc2 | −0.258 | −0.237 | −0.255 |
| (7) | \|fw\|/fc13 | 0.078 | 0.082 | 0.080 |
| (8) | \|fw\|/Rc1 | 0.161 | 0.148 | 0.161 |
| (9) | \|fw\|/Rc2 | 0.101 | 0.020 | 0.056 |
| (10) | d12/d2r | 0.471 | 0.379 | 0.424 |
| (11) | d2r/Ymax | 3.859 | 4.525 | 4.068 |
| (12) | \|fw\|/f1 | 0.520 | 0.514 | 0.529 |
| (13) | \|fw\|/f2 | 0.008 | 0.020 | 0.006 |

As can be seen from the above-mentioned data, each of the zoom lenses of Examples 1 to 3 is configured as a wide angle zoom lens to have a maximum total angle of view of 137° or more at the wide-angle end, has a small F number of less than 2.4, whereby aberrations are satisfactorily corrected, and high optical performance is achieved.

Figure 7:
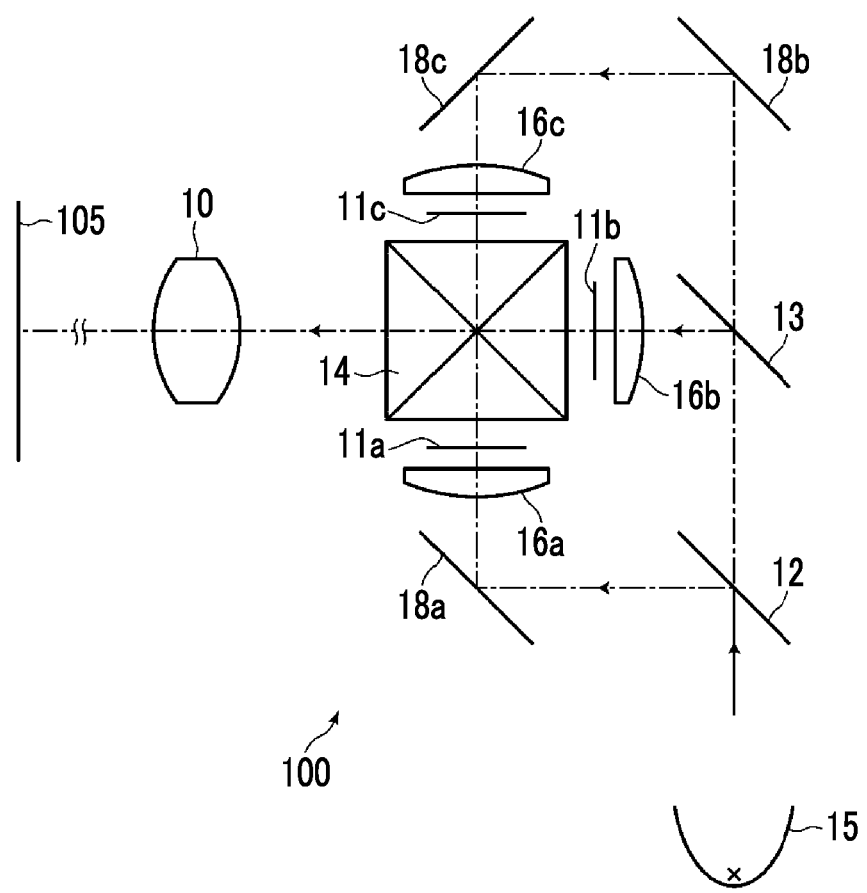
FIG. 7 is a schematic configuration diagram of a projection display device according to an embodiment of the present invention.

Next, a projection display device according to an embodiment of the present invention will be described. FIG. 7 is a schematic configuration diagram of the projection display device according to the embodiment of the present invention. The projection display device 100 shown in FIG. 7 has a zoom lens 10 according to the embodiment of the present invention, a light source 15, transmissive display elements 11a to 11c as light valves corresponding to the respective color light beams, dichroic mirrors 12 and 13 for color separation, a cross dichroic prism 14 for color synthesis, condenser lenses 16a to 16c, and total reflection mirrors 18a to 18c for deflecting the optical path. In FIG. 7, the zoom lens 10 is schematically illustrated. Further, an integrator is disposed between the light source 15 and the dichroic mirror 12, but illustration thereof is omitted in FIG. 7.

White light originating from the light source 15 is separated into rays with three colors (G light, B light, R light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the zoom lens 10. The zoom lens 10 projects an optical image, which is formed by the light modulated through the transmissive display elements 11a to 11c, onto a screen 105.

Figure 8:
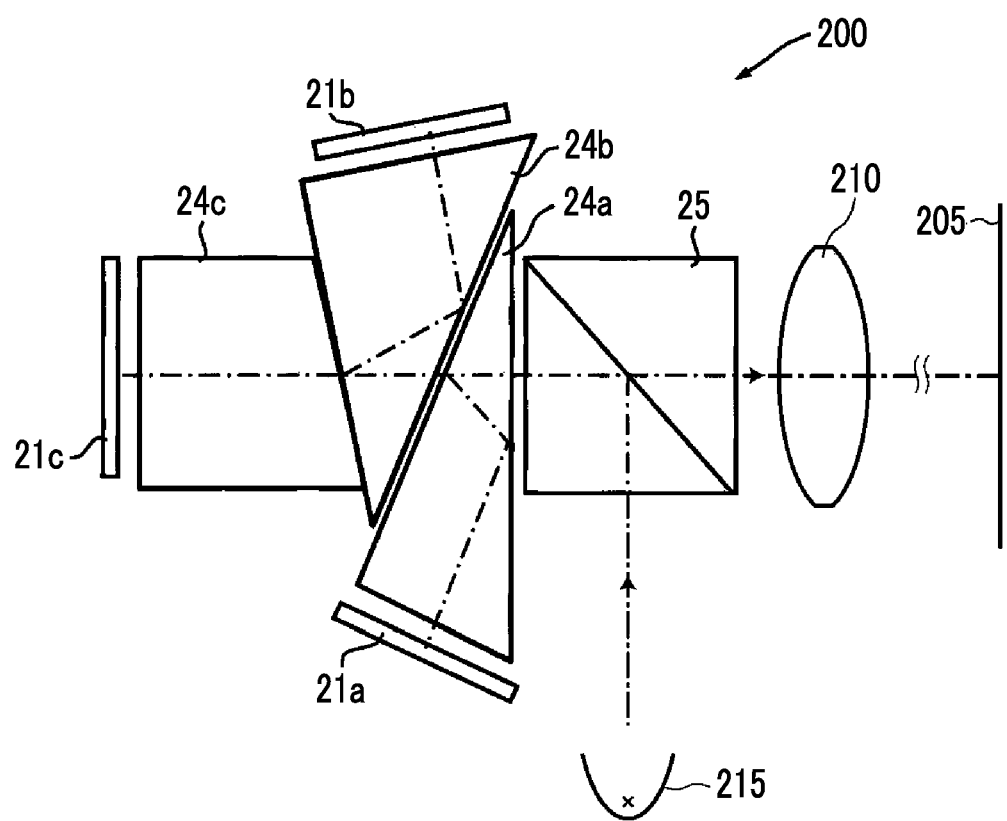
FIG. 8 is a schematic configuration diagram of a projection display device according to another embodiment of the present invention.

FIG. 8 is a schematic configuration diagram of a projection display device according to another embodiment of the present invention. The projection display device 200 shown in FIG. 8 has a zoom lens 210 according to the embodiment of the present invention, a light source 215, DMD elements 21a to 21c as light valves corresponding to the respective color light beams, total internal reflection (TIR) prisms 24a to 24c for color separation and color synthesis, and a polarization separating prism 25 that separates illumination light and projection light. In FIG. 8, the zoom lens 210 is schematically illustrated. Further, an integrator is disposed between the light source 215 and the polarization separating prism 25, but illustration thereof is omitted in FIG. 8.

White light originating from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the zoom lens 210. The zoom lens 210 projects an optical image, which is formed by the light modulated through the DMD elements 21a to 21c, onto a screen 205.

Figure 9:
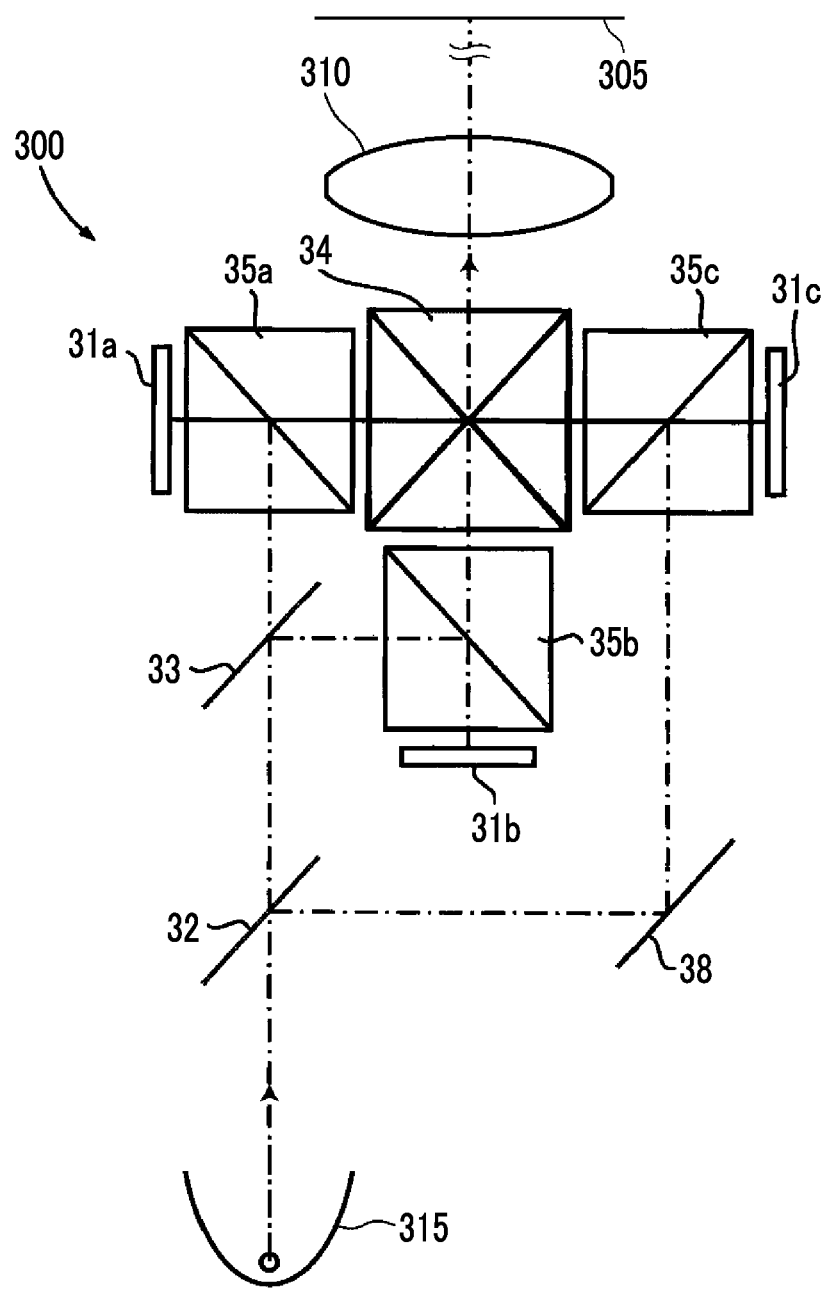
FIG. 9 is a schematic configuration diagram of a projection display device according to still another embodiment of the present invention.

FIG. 9 is a schematic configuration diagram of a projection display device according to still another embodiment of the present invention. The projection display device 300 shown in FIG. 9 has a zoom lens 310 according to the embodiment of the present invention, a light source 315, reflective display elements 31a to 31c as light valves corresponding to respective color light beams, dichroic mirrors 32 and 33 for color separation, a cross dichroic prism 34 for color synthesis, a total reflection mirror 38 for deflecting the optical path, and polarization separating prisms 35a to 35c. In FIG. 9, the zoom lens 310 is schematically illustrated. Further, an integrator is disposed between the light source 315 and the dichroic mirror 32, but illustration thereof is omitted in FIG. 9.

White light originating from the light source 315 is separated into rays with three colors (G light, B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the zoom lens 310. The zoom lens 310 projects an optical image, which is formed by the light modulated through the reflective display elements 31a to 31c, onto a screen 305.

Figure 10:
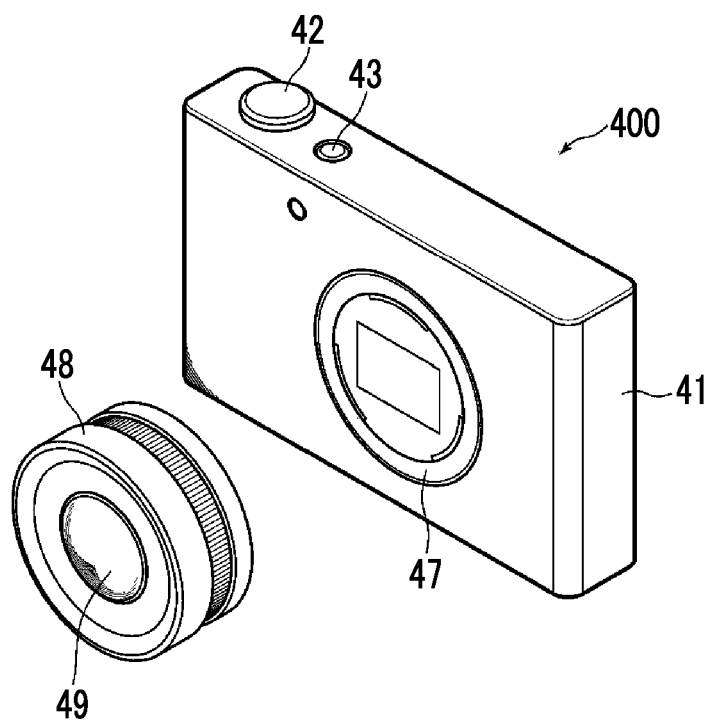
FIG. 10 is a perspective view of the front side of an imaging apparatus according to an embodiment of the present invention.
Figure 11:
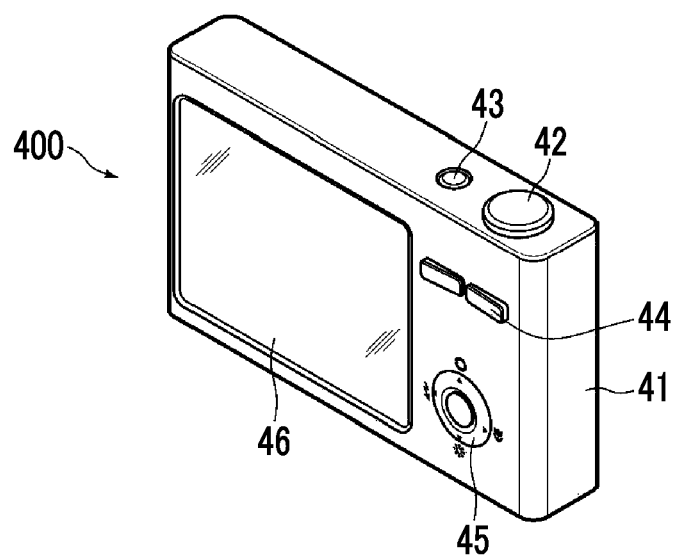
FIG. 11 is a perspective view of the rear side of the imaging apparatus shown in FIG. 10.

FIGS. 10 and 11 are external views of a camera 400 which is the imaging apparatus according to the embodiment of the present invention. FIG. 10 is a perspective view of the camera 400 viewed from the front side, and FIG. 11 is a perspective view of the camera 400 viewed from the rear side. The camera 400 is a single-lens digital camera on which an interchangeable lens 48 is detachably mounted and which has no reflex finder. The interchangeable lens 48 is configured such that a zoom lens 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) outputs a captured image signal based on a subject image which is formed through the interchangeable lens 48. The signal processing circuit generates an image through processing of the captured image signal which is output from the imaging element. The recording medium records the generated image. The camera 400 captures a still image or a moving image by pressing the shutter button 42, and records image data, which is obtained through imaging, in the recording medium.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric coefficient of each lens are not limited to the values shown in the numerical examples, and different values may be used therefor.

Further, the projection display device of the present invention is not limited to that of the above-mentioned configuration. For example, the used light valve and the optical member used in the separation or synthesis of rays are not limited to those of the above-mentioned configuration, and may be modified into various forms.

Further, the imaging apparatus of the present invention is also not limited to the above-mentioned configurations. For example, the present invention may be applied to a single-lens reflex camera, a film camera, a video camera, and the like.

What is claimed is:

1. A zoom lens that forms an intermediate image at a position conjugate to a reduction side imaging plane and causes the intermediate image to be re-imaged on a magnification side imaging plane, the zoom lens consisting of, in order from a magnification side toward a reduction side:
    a first optical system; and
    a second optical system,
    wherein the intermediate image is positioned between the first optical system and the second optical system,
    wherein the first optical system consists of, in order from the magnification side, a first lens group that has a negative refractive power as a whole, a second lens group, a third lens group, a fourth lens group, and a fifth lens group, and the second lens group, the third lens group, and the fourth lens group move by changing spacings between groups adjacent to each other in an optical axis direction during zooming,
    wherein the first optical system has three or more negative lenses continuously in order from a position closest to the magnification side,
    wherein the first optical system has a first cemented lens which is formed by cementing a positive lens, a negative lens, and a positive lens in order from the magnification side, and an Abbe number of each of the two positive lenses within the first cemented lens at a d line is larger than that of the negative lens within the first cemented lens, and
    wherein a second cemented lens, which is formed by cementing a negative lens and a positive lens and has a positive refractive power as a whole, is disposed to be closest to the magnification side of the second optical system.

2. The zoom lens according to claim 1, wherein the following conditional expression (1) is satisfied, $$8 < v2n - v2p < 30 \tag{1},$$

where $v2n$ is an Abbe number of the negative lens within the second cemented lens at the d line, and
$v2p$ is an Abbe number of the positive lens within the second cemented lens at the d line.

3. The zoom lens according to claim 1, wherein the following conditional expression (2) is satisfied, $$30 < v11 - v12 < 42 \tag{2},$$

where $v11$ is an Abbe number of the positive lens close to the magnification side within the first cemented lens at the d line, and
$v12$ is an Abbe number of the negative lens within the first cemented lens at the d line.

4. The zoom lens according to claim 1, wherein the following conditional expression (3) is satisfied, $$50 < v13 - v12 < 60 \tag{3},$$

where ν13 is an Abbe number of the positive lens close to the reduction side within the first cemented lens at the d line, and ν12 is an Abbe number of the negative lens within the first cemented lens at the d line.

5. The zoom lens according to claim 1, wherein the following conditional expression (4) is satisfied, $$-0.1 < |fw|/fc1 < 0 \qquad (4),$$

where fw is a focal length of the zoom lens at a wide-angle end, and fc1 is a focal length of the first cemented lens.

6. The zoom lens according to claim 1, wherein the following conditional expression (5) is satisfied, $$0 < |fw|/fc11 < 0.4 \qquad (5),$$

where fw is a focal length of the zoom lens at a wide-angle end, and fc11 is a focal length of the positive lens close to the magnification side within the first cemented lens.

7. The zoom lens according to claim 1, wherein the following conditional expression (6) is satisfied, $$-0.5 < |fw|/fc12 < -0.1 \qquad (6),$$

where fw is a focal length of the zoom lens at a wide-angle end, and fc12 is a focal length of the negative lens within the first cemented lens.

8. The zoom lens according to claim 1, wherein the following conditional expression (7) is satisfied, $$0 < |fw|/fc13 < 0.2 \qquad (7),$$

where fw is a focal length of the zoom lens at a wide-angle end, and fc13 is a focal length of the positive lens close to the reduction side within the first cemented lens.

9. The zoom lens according to claim 1, wherein the first cemented lens is disposed in the third lens group.

10. The zoom lens according to claim 1, wherein the following conditional expression (8) is satisfied, $$0.1 < |fw|/Rc1 < 0.168 \qquad (8),$$

where fw is a focal length of the zoom lens at a wide-angle end, and

Rc1 is a radius of curvature of a cemented surface close to the reduction side within the first cemented lens.

11. The zoom lens according to claim 1, wherein the following conditional expression (9) is satisfied, $$0 < |fw|/Rc2 < 0.2 \qquad (9),$$

where fw is a focal length of the zoom lens at a wide-angle end, and

Rc2 is a radius of curvature of a surface of the second cemented lens closest to the reduction side.

12. The zoom lens according to claim 1, further comprising a lens at a position closer to the reduction side than the second cemented lens, wherein the following conditional expression (10) is satisfied, $$0.2 < d12/d2r < 0.7 \qquad (10),$$

where d12 is a spacing on the optical axis between a lens surface of the first optical system closest to the reduction side and a lens surface of the second optical system closest to the magnification side, and d2r is a spacing on the optical axis between a lens, which is continuously disposed with the second cemented lens on the reduction side of the second cemented lens, and the second cemented lens.

13. The zoom lens according to claim 1, further comprising a lens at a position closer to the reduction side than the second cemented lens, wherein the following conditional expression (11) is satisfied, $$1.5 < d2r/Y\max < 5 \qquad (11),$$

where d2r is a spacing on the optical axis between a lens, which is continuously disposed with the second cemented lens on the reduction side of the second cemented lens, and the second cemented lens, and Ymax is a maximum image height on the reduction side.

14. The zoom lens according to claim 1, wherein the following conditional expression (12) is satisfied, $$0.2 < |fw|/f1 < 1 \qquad (12),$$

where fw is a focal length of the zoom lens at a wide-angle end, and f1 is a focal length of the first optical system at the wide-angle end.

15. The zoom lens according to claim 1, wherein the following conditional expression (13) is satisfied, $$0 < |fw|/f2 < 0.15 \qquad (13),$$

where fw is a focal length of the zoom lens at a wide-angle end, and f2 is a focal length of the second optical system at the wide-angle end.

16. A projection display device comprising:

a light source;

a light valve into which light originated from the light source is incident; and the zoom lens according to claim 1, the zoom lens projecting an optical image, which is formed by light modulated through the light valve, onto a screen.

17. An imaging apparatus comprising the zoom lens according to claim 1.

* * * * *